Figure 1:
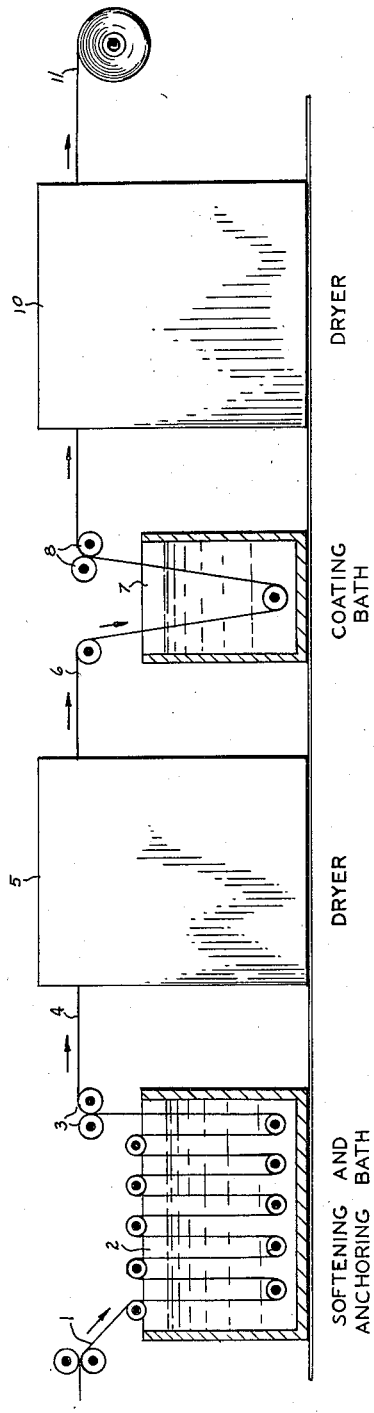

Feb. 11, 1958

L. HAGAN ET AL 2,823,141

PROCESS FOR COATING REGENERATED CELLULOSE
FILM WITH RESIN AND RESULTING PRODUCT

Filed May 8, 1953

INVENTOR.
LAMONT HAGAN
GEORGE R. MITCHELL

Bryant W. Brennan
Atty.

United States Patent Office 2,823,141
Patented Feb. 11, 1958

2,823,141

PROCESS FOR COATING REGENERATED CELLULOSE FILM WITH RESIN AND RESULTING PRODUCT

Lamont Hagan, Guilford, and George R. Mitchell, Branford, Conn., assignors to Olin Mathieson Chemical Corporation, a corporation of Virginia Application May 8, 1953, Serial No. 353,898

9 Claims. (Cl. 117—76)

This invention is concerned with the production of moistureproof, heat-sealable regenerated cellulose film, top-coated with an organic polymeric material that provides these properties, and more particularly with satisfactory anchoring of this top-coating to the film with a non-resinous, non-blocking anchoring material.

The anchoring resins, e. g. urea formaldehyde resin, and the methods commonly used for anchoring or bonding the top coat to the base film with these resins, are disclosed in the Charch and Bateman Patent No. 2,159,007, issued May 23, 1939. As disclosed in that patent, the anchoring resin is normally applied to the regenerated cellulose film while the latter is in the gel condition, which film has been cast from viscose, desulfured, bleached and washed free from impurities in the usual manner on the casting machine and is ready to be softened by treating with an aqueous glycerine bath. The anchoring resin is usually incorporated in this softening bath.

These commonly used anchoring resins are subject to the disadvantage of causing "blocking" of the film treated therewith, prior to top-coating. This blocking makes it difficult or impossible, depending upon the degree present, to unwind the anchored film for applying the final, moistureproof, heat-sealing top coat.

We have discovered that this blocking difficulty can be entirely avoided by omitting the anchoring resin and using instead a fundamentally different type of material, which is non-resinous and which has no blocking tendencies. It is a quaternary ammonium compound, and may be selected from such compounds having the following formula:

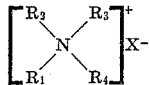

wherein $R_1$, $R_2$, $R_3$ and $R_4$ may be alkyl radicals having 1 to 16 carbon atoms, or phenyl and benzyl radicals, and $X^-$ is a halide ion.

Illustrative examples of the above types of compounds which we have found to give good results are as follows: tetramethyl ammonium chloride, phenyl trimethyl ammonium chloride, cetyl dimethyl benzyl ammonium chloride, alkyl dimethyl benzyl ammonium chloride, dicoco dimethyl ammonium chloride and dodecyl trimethyl ammonium chloride.

Films anchored with one of the above quaternary ammonium compounds, in accordance with this invention, may be top-coated with a suitable aqueous dispersion type of moistureproof, heat-sealable top coating, such as for example, the vinylidene chloride copolymer type of coating disclosed in Gilbert Pitzl Patent 2,570,478, issued October 9, 1951.

The quaternary ammonium compound, which is to be substituted for the anchoring resin in accordance with the present invention, may be incorporated in the softening bath and added to the gel film at the same time and along with the glycerine or similar softening agent.

After the gel film is treated with the aqueous solution of quaternary ammonium compound and softening agent, it is then dried in the customary manner by passing the film over the heated dryer rolls of the casting machine. After drying, the thus treated film is then provided with the aqueous dispersion moistureproofing coating.

Figure 2:
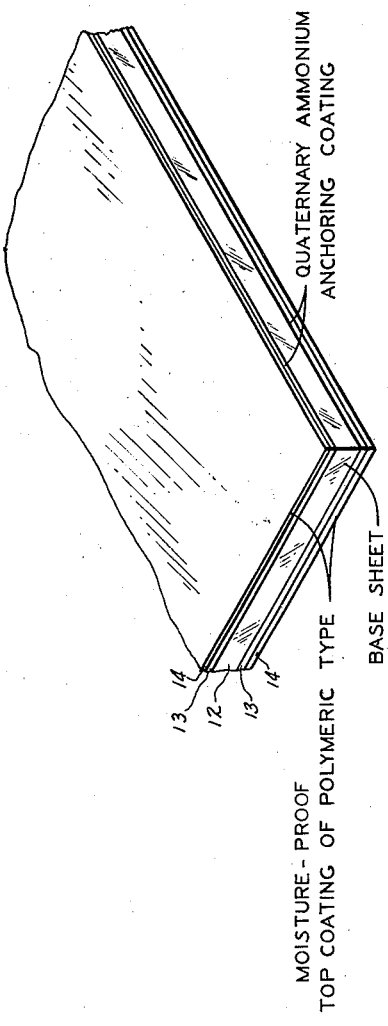

A typical process according to the present invention may be illustrated by the accompanying drawing in which:

Figure 1 is a sectional elevation showing one way of applying the non-blocking quaternary ammonium anchoring agents of the present invention to regenerated cellulose film and thereafter applying a moisture-proofing coating; and Figure 2 is an isometric view showing the moisture-proofing coating anchored to the regenerated cellulose base sheet.

In carrying out the invention, according to Fig. 1, a sheet of purified and washed gel regenerated cellulose 1 is passed thru a softening bath 2 containing the quaternary ammonium anchoring agent. Excess bath is removed by means of a suitable doctoring device such as rolls 3. The treated film 4 is then dried by passing through a suitable drier 5 which can be of the tower, heated dryer rol type or the like. The dried film 6 can then be wound up and stored, for further treatment, or it can be directly treated with a coating bath 7. Any conventional manner of applying the moisture-proof coating can, of course, be employed. The excess coating material is removed by means of a doctoring device 8. The coated film is then passed through a drier 10 to dry the coating composition. The finished product 11 can then be wound in rolls and stored.

Figure 2 is a perspective view which shows the cellulosic film 12 with anchoring coat 13 firmly anchoring top coat 14 thereto.

The "blocking" of the film by the usual anchoring resin normally takes place between the time the film is dried on the casting machine and the time when the moistureproof, heat-sealable top coat is applied. During this interval, the dried film is normally wound up on a roll and will remain in storage for a matter of hours or days, depending upon inventory, before it is again unwound for application of the moistureproof, heat-sealable top coat. It is during this interval, and particularly in the lag storage period that blocking of the film occurs, this blocking being caused principally by a setting or curing of the resin which takes place progressively over a period of time.

By avoiding the use of any anchoring resin, and using instead a quaternary ammonium compound of the above type, pursuant to this invention, no opportunity is provided for blocking properties to be established in the film, irrespective of the length of lapsed time between the incorporation of the compound in the film on the casting machine and the subsequent unwinding and top-coating of the film. Accordingly, the substitution of the usual anchoring resin by the quaternary ammonium compound completely eliminates this important blocking problem, the elimination of which has been attempted many times heretofore, but without any complete success.

Although certain quaternary ammonium compounds have been suggested for use heretofore for various and sundry purposes, including coating of plain, transparent, non-moistureproof types of films treated with glycerine or similar softening agents to prevent sticking together of this type of film when it absorbs moisture, it has not been previously conceived or suggested, as far as we know, to use suitable types of quaternary ammonium compounds to avoid the age-old blocking problem in moistureproof, heat-sealable regenerated cellulose films, caused by anchoring resins. We have discovered that quaternary ammonium compounds of the type illustrated by the above structural formula are very effective agents for eliminating the blocking problem in moistureproof film manufacture, and thus constitute an advance of major commercial importance in this field.

Additional advantages that result from use of the quaternary ammonium compounds in place of anchoring resins, in accordance with this invention, include the following:

The pH of the aqueous solution in which the quaternary ammonium compounds are applied to the film, along with the glycerine or other softener if desired, does not have to be controlled as it does for the resin anchorage process. In the latter process the pH of the resin solution has to be adjusted to the right acidity to control the aging or setting of the resin. Also, the use of quaternary ammonium compounds instead of anchoring resins, avoids the usual accumulation or build-up of resin deposit on the rolls in the casting machine.

The type of top coat best suited for obtaining the moistureproof, heat-sealable properties in the regenerated cellulose film, prepared in accordance with this invention, is the aqueous dispersion disclosed in the above Gilbert Pitzl Patent 2,570,478, and which consists of a tripolymer of vinylidene chloride, itaconic acid and methyl acrylate or the equivalent. In accordance with the disclosure in that patent, this aqueous dispersion polymeric type top coat does not require the use of an anchoring agent for anchoring or bonding the top coat to the base cellophane film. Nevertheless, we have discovered from experience with that type of top coat that it is not sufficiently self-anchoring and that for best results an anchoring agent should be used. We have further discovered that the above-mentioned types of quaternary ammonium compounds are particularly suitable for anchoring the tripolymer top coat, disclosed in this Pitzl Patent 2,570,478, to the base film. We have also found that by using the quaternary ammonium compounds as an anchoring agent for this type of polymeric top coat, the heat-seal properties of the final film are substantially improved. Illustrative heat-seal values of films produced in accordance with this invention, and containing a quaternary ammonium compound as the anchoring agent, and the above tripolymer type of top coat, are as follows:

|  | At 75° C./ 35% R. H. | At 100° C./ 92% (72 hrs.) |
| --- | --- | --- |
|  | Gms. | Gms. |
| Avg | 480 | 268 |
| Max | 500 | 340 |
| Min | 460 | 130 |

Further illustrative but non-limiting examples of the heat-seal strengths obtained by use of several of the quaternary ammonium compounds used in this invention are the following:

| Base Sheet Impregnant | Strength of Heat-Seal (Grams) | | |
| --- | --- | --- | --- |
|  | 75°/35% R. H. | 75°/81% R. H. | 75°/93% R. H. |
| Dicoco dimethyl ammonium chloride | 387 | 211 | 199 |
| Dodecyl trimethyl ammonium chloride | 335 | 204 | 162 |
| Phenyl trimethyl ammonium chloride | 334 | 221 | 203 |
| Tetramethyl ammonium chloride | 320 | 160 | 160 |
| Alkyl dimethyl benzyl ammonium chloride | 256 | 215 | 124 |

The above heat-seal values were obtained in accordance with the test conditions defined in R. T. Ubben Patent No. 2,147,180, issued February 14, 1939, which is the well-known and more or less standard test used in the industry today for determining heat-seal values of coated films. As explained in the above Patent No. 2,147,180, the heat-seal tests are made on two strips of coated film 1½" wide, and accordingly the heat-seal strengths specified in grams in the above tabulations refer to 1½" width films.

The relatively non-blocking characteristics of the quaternary ammonium compounds, when used in accordance with this invention, are shown by the following comparative data for these compounds and for the usual resinous anchoring agents:

| Anchoirng Agent | Anchoring Agent Concentration, percent | Accelerated Blocking Test Grade |
| --- | --- | --- |
| Dicoco dimethyl ammonium chloride (Arquad 2C) | 0.83 | 1 |
| Dodecyl trimethyl ammonium chloride (Arquad 12) | 0.53 | 1+ |
| Phenyl trimethyl ammonium chloride | 0.34 | 1+ |
| Urea formaldehyde resin (RAC 728) | 0.30 | 5 |
| Do | 0.50 | 5 |

The above "blocking" test values were obtained by an accelerated blocking test which consists essentially of:

*Accelerated blocking test procedure*

Cut 30 sheets of film 4" x 4", and stack in a 45° C. oven for 72 hours under a pressure of ⅓ lbs./sq. in. Remove the film from the oven and grade as follows:

Grade 1—sheets falling apart
Grade 2—sheets easily peeled apart after being folded horizontally, vertically and diagonally through the center
Grade 3—sheets peeled without effort
Grade 4—sheets peeled apart without tearing
Grade 5—sheets peeled apart with tearing In the usual case, to obtain the improvements characteristic of this invention, the amount of the quaternary ammonium compound may range from approximately 0.1% to 3%, by weight of the softener bath, and a typical amount used to give good results is 0.5%.

A characteristic of the above-mentioned quaternary ammonium compounds, which is believed to be important in their function to produce the improved results obtained herein, is that these compounds are cation-active, surface-active materials, and when used with the above polymeric top-coating material which is anion-active, there is established a strong bonding relationship between these two materials as well as between the coating and the anion-active surface of the regenerated cellulose film. In the above-mentioned tripolymer top-coating composition, there is included an anion-active material, namely, "Duponol WAQ," which is a long chain sulfonated alcohol, and this constituent of the polymeric coating renders it anion-active and thereby particularly coactive with the quaternary ammonium compound to produce a strong bond and a heat-seal which is highly resistant to rupture even under the high relative humidity test conditions of 85% or 92%, and high temperatures.

The copolymer top coat may be applied to the regenerated cellulose base film by any of the standard procedures and in aqueous dispersion form which avoids the necessity of any solvent recovery.

The non-blocking quaternary ammonium anchoring agents of the present invention may be used generally in connection with anionic aqueous dispersion types of top-coating compositions with which they are compatible, and these anchoring compounds may be incorporated, as above suggested, in the softening bath on the regenerated cellulose film casting machine and which bath will contain the usual softening agents such as glycerine or ethylene glycol. The above test data were obtained from films first coated in the softening bath containing about 12% ethylene glycol and the quaternary ammonium anchoring agents in the different percentages shown above. It is to be understood that the invention is not limited to any particular softener or percentage thereof and, although the quaternary ammonium compound is applied to the film in the

We claim:
1. In a process of producing a moistureproof, heat-sealable regenerated cellulose film containing a top coat that imparts these properties to the film, the improvement of avoiding any blocking of the film, as described herein, by first treating the film with an aqueous solution containing as the sole anchoring material a quaternary ammonium compound of the following formula:

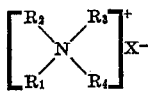

wherein $R_1$, $R_2$, $R_3$ and $R_4$ are radicals selected from the group consisting of alkyl radicals having 1 to 6 carbon atoms, phenyl and benzyl radicals, and $X^-$ is a halide ion, drying the coated film and then top-coating the thus treated film with an anionic aqueous dispersion of a moistureproof, heat-sealable top-coating composition.

2. In a process of producing a moistureproof, heat-sealable regenerated cellulose film containing a top coat that imparts these properties to the film, the improvement of avoiding any blocking of the film, as described herein, by first treating the film with an aqueous solution containing as the sole anchoring material a quaternary ammonium compound of the following formula:

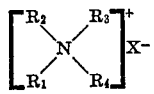

wherein $R_1$, $R_2$, $R_3$ and $R_4$ are radicals selected from the group consisting of alkyl radicals having 1 to 16 carbon atoms, phenyl and benzyl radicals, and $X^-$ is a halide ion, the amount of said compound being within the range of approximately 0.1% to 3%, by weight of the treating bath, followed by drying the film and finally applying the moistureproof, heat-sealable top coat to the film.

3. A moistureproof, heat-sealable regenerated cellulose film top-coated with an aqueous dispersion of a tripolymer of vinylidene chloride, itaconic acid and methyl acrylate and containing as the sole anchoring and heat-seal coating beneath said top coat, a quaternary ammonium compound of the following formula:

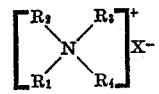

wherein $R_1$, $R_2$, $R_3$ and $R_4$ are radicals selected from the group consisting of alkyl radicals having 1 to 16 carbon atoms, phenyl and benzyl radicals, and $X^-$ is a halide ion.

4. A moistureproof, heat-sealable regenerated cellulose film top-coated with an aqueous dispersion of a tripolymer of vinylidene chloride, itaconic acid and methyl acrylate and containing as the sole non-blocking, anchoring and heat-seal improving sub-coat, a quaternary ammonium compound selected from the group consisting of tetramethyl ammonium chloride, phenyl trimethyl ammonium chloride, cetyl dimethyl benzyl ammonium chloride, alkyl dimethyl benzyl ammonium chloride, dicoco dimethyl ammonium chloride and dodecyl trimethyl ammonium chloride.

5. A moistureproof, heat-sealable regenerated cellulose film top-coated with an aqueous dispersion of a tripolymer of vinylidene chloride, itaconic acid and methyl acrylate and containing as the sole non-blocking, anchoring and heat-seal improving sub-coat, dicoco dimethyl ammonium chloride.

6. A moistureproof, heat-sealable regenerated cellulose film top-coated with an aqueous dispersion of a tripolymer of vinylidene chloride, itaconic acid and methyl acrylate and containing as the sole non-blocking, anchoring and heat-seal improving sub-coat, dodecyl trimethyl ammonium chloride.

7. A moistureproof, heat-sealable regenerated cellulose film top-coated with an aqueous dispersion of a tripolymer of vinylidene chloride, itaconic acid and methyl acrylate and containing as the sole non-blocking, anchoring and heat-seal improving sub-coat, tetramethyl ammonium chloride.

8. A moistureproof, heat-sealable regenerated cellulose film top-coated with an aqueous dispersion of a tripolymer of vinylidene chloride, itaconic acid and methyl acrylate and containing as the sole non-blocking, anchoring and heat-seal improving sub-coat, phenyl trimethyl ammonium chloride.

9. A process for coating a regenerated cellulose film with an organic polymeric material comprising coating the film with an aqueous solution containing a non-resinous anchoring material consisting essentially of a quaternary ammonium compound having the formula

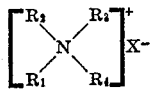

wherein $R_1$, $R_2$, $R_3$ and $R_4$ are radicals selected from the group consisting of alkyl radicals having from 1 to 16 carbon atoms, phenyl radicals and benzyl radicals and $X^-$ is a halide ion, drying the coating, and thereafter applying a coating of an aqueous dispersion of a tripolymer of vinylidine chloride, itaconic acid and methyl acrylate, and again drying the film.

References Cited in the file of this patent

UNITED STATES PATENTS

| | | |
|---|---|---|
| 2,570,478 | Pitzl | Oct. 9, 1951 |
| 2,715,078 | Cohen | Aug. 9, 1955 |

FOREIGN PATENTS

| | | |
|---|---|---|
| 670,108 | Great Britain | Apr. 16, 1952 |
| 675,475 | Great Britain | July 9, 1952 |
| 677,926 | Great Britain | Aug. 27, 1952 |
| 679,054 | Great Britain | Sept. 10, 1952 |

U. S. DEPARTMENT OF COMMERCE
PATENT OFFICE

CERTIFICATE OF CORRECTION

Patent No. 2,823,141                                      February 11, 1958

Lamont Hagan et al.

It is hereby certified that error appears in the printed specification of the above numbered patent requiring correction and that the said Letters Patent should read as corrected below.

Column 5, line 20, for "1 to 6 carbon" read -- 1 to 16 carbon --.

Signed and sealed this 15th day of April 1958.

(SEAL)
Attest:

KARL H. AXLINE                                           ROBERT C. WATSON
Attesting Officer                                    Commissioner of Patents